United States Patent

Civanlar et al.

[11] Patent Number: 5,691,768
[45] Date of Patent: Nov. 25, 1997

[54] MULTIPLE RESOLUTION, MULTI-STREAM VIDEO SYSTEM USING A SINGLE STANDARD DECODER

[75] Inventors: Mehmet Reha Civanlar, Middletown; Robert D. Gaglianello, Little Silver, both of N.J.

[73] Assignee: Lucent Technologies, Inc., Murray Hill, N.J.

[21] Appl. No.: 499,807

[22] Filed: Jul. 7, 1995

[51] Int. Cl.[6] ........................................ H04N 7/46
[52] U.S. Cl. ...................... 348/392; 348/423; 348/424
[58] Field of Search ................................ 348/390, 392, 348/423, 424; H04N 7/46

[56] References Cited

U.S. PATENT DOCUMENTS

5,262,855  11/1993  Alattar ................................. 348/424
5,481,297  1/1996  Cash .................................... 348/398

*Primary Examiner*—Howard W. Britton
*Attorney, Agent, or Firm*—Stephen M. Gurey

[57] ABSTRACT

A video system is disclosed in which a single generic MPEG standard encoder (107) is used to simultaneously code and compress plural different resolution video signals from a single input video signal; and in which a single generic MPEG standard decoder (402) is used to simultaneously decode plural coded and compressed video signals of different resolutions and form a single composite video signal. The coder converts each frame of pixel data of the input video signal into plural frames having different resolutions, which are then combined into a common frame (106) for input to the generic MPEG encoder. The MPEG encoder produces a single coded and compressed output bitstream in slices of macroblocks of pixel data, which output bitstream is demultiplexed (108) into separate resolution bitstreams using Slice Start Code identifiers associated with each slice and Macroblock Address Increments associated with the first macroblock in each slice, to properly route each slice to the appropriate output. The decoder processes (405) the slices within the coded and compressed bitstreams of different resolutions received from plural sources using the Slice Start Codes and Macroblock Address Increments of each slice to produce a single composite bitstream of successive slices. By merging the slices from the plural sources into the composite bitstream in a predetermined manner, the generic MPEG decoder produces a digital output video signal that is a composite of the different resolution input video signals.

22 Claims, 5 Drawing Sheets

MULTIPLE RESOLUTION, MULTI-STREAM VIDEO SYSTEM USING A SINGLE STANDARD DECODER

CROSS REFERENCE TO RELATED APPLICATIONS

This application describes and claims subject matter that is also described in our co-pending United States patent application also assigned to the present assignee hereof and filed simultaneously herewith: "MULTIPLE RESOLUTION, MULTI-STREAM VIDEO SYSTEM USING A STANDARD CODER", Ser. No. 08/499,700.

TECHNICAL FIELD

This invention relates to the decoding of video signals, and more particularly to the combination of multiple coded video signals having different resolutions into a single video signal using a single standard video decoder.

BACKGROUND OF THE INVENTION

The acceptance of digital video compression standards, for example, the Motion Picture Expert Group (MPEG) standard, combined with the availability of a high-bandwidth communication infrastructure have poised the telecommunications market for an explosion of video based services. Services such as video-on-demand, multi-party interactive video games, and video teleconferencing are actively being developed. These and other future video services will require a cost-effective video composition and display technique.

An efficient multiple window display is desirable for displaying the multiple video sequences produced by these applications to a video user or consumer. The implementation of such a windows environment would permit a user to simultaneously view several video sequences or images from several sources. The realization of a commercial multiple window video display is hampered by technological limitations on available data compression equipment.

In digital television and other digital image transmission and storage applications, image signals must be compressed or coded to reduce the amount of bandwidth required for transmission or storage. Typically, a full screen frame of video may be composed of an array of at least 640×480 picture elements, or pixels, each pixel having data for luminance and chrominance. A video sequence is composed of a series of such discrete video frames, similar to the frames in a moving picture film. True entertainment quality video requires a frame rate of at least thirty frames per second. Uncompressed, the bit rate required to transmit thirty frames per second would require far more bandwidth than is presently practical.

Image coding techniques serve to compress the video data in order to reduce the number of bits transmitted per frame. There are several standard image coding techniques, each of which takes advantage of pixel image data repetition, also called spatial correlation.

Spatial correlation occurs when several adjacent pixels have the same or similar luminance (brightness) and chrominance (color) values. Consider, for example, a frame of video containing the image of a blue sky. The many pixels comprising the blue sky image will likely have identical or near identical image data. Data compression techniques can exploit such repetition by, for example, transmitting, or storing, the luminance and chrominance for data for one pixel and transmitting, or storing, information on the number of following pixels for which the data is identical, or transmitting, or storing, only the difference between adjacent pixels. Presently, spatial correlation is exploited by compression techniques using discrete cosine transform and quantization techniques. Where such data compression or coding is employed, each video source must be equipped with data compression equipment and each video receiver must likewise be equipped with decoding equipment. Several video coding protocols are well-known in the art, including JPEG, MPEG1, MPEG2 and P×64 standards.

In a multipoint video application, such as a video teleconference, a plurality of video sequences from a plurality of sources are displayed simultaneously on a video screen at a receiving terminal. In order to display multiple windows, the prior art generally required multiple decoding devices to decode the multiple video signals from the multiple sources. At present, multiple decoder devices are expensive, and therefore an impractical solution for creating multiple video windows.

A further difficulty encountered in multiple window video is that many sources provide video in only one screen display size. In fact, many sources transmit only full screen images which typically comprise 640×480 pixels per frame. To provide truly flexible windowing capabilities, different users should have the option of invoking and viewing differently sized windows of the same video. Windows which comprise a fraction of the entire display require the image data to be filtered and subsampled, resulting in frame signals comprising less pixels. It is therefore advantageous to make video data available at a plurality of window sizes or resolution levels, For example, the video of a participant in a teleconference may be made available at full screen resolution, ¼ screen, ⅟₁₆ screen or ⅟₆₄ screen, so that the other participants can choose a desired size window in which to view the transmitting participant. Other examples in which it would be advantageous to generate multiple resolution video signals would be picture-in-picture for digital TV in which a user would receive signals from plural sources at only the resolutions necessary to fill a selected image size. Similarly, a video server might output multiple resolution streams to enable a user to display images from multiple sources in different windows. Each window requires less than full resolution quality. Thus, by transmitting to the user only that bitstream associated with the size of the image requested to be displayed rather than a full resolution bitstream, substantial bandwidth can be saved as can the processing power to decode the full-resolution bitstream and to scale the resulting video to the desired less than full resolution image size.

Under one technique of providing multiple resolution levels, each video transmitter provides a plurality of video sequence, each independently containing the data signal for a particular resolution level of the same video image. One method of generating multiple resolution video sequences would be to employ several encoders, one for each resolution level. The requirement of multiple encoders, however, as in the case of decoders, increases system cost since encoders comprise costly components in digital video transmission systems.

The inventors of the present invention are co-inventors, together with G. L. Cash and D. B. Swicker, of co-pending patent application, Ser. No. 08/201,871, filed Feb. 25, 1994 now U.S. Pat. No. 5,481,297. In that application, a multipoint digital video communication system is described which employs a single standard encoder, such as JPEG or MPEG, to encode multiple resolution video signals derived from a full resolution video signal, and a single standard decoder, such as JPEG or MPEG, to decode and display multiple resolution video signals. In that system, macroblocks of a sampled full resolution video signal and macroblocks of a subsampled input video signal at multiple different fractional resolutions are multiplexed into a single stream before being fed to the single standard video encoder, which encodes or compresses each macroblock individually. Because MPEG-based standard compression systems employ interframe coding in which the encoder relies on information from previous (and in some cases future) frames, a reference frame store must provide separate reference frame information to the encoder for each resolution. Thus, control logic is necessary to change the reference frame buffer as well as the resolution related information in accordance with each macroblock's resolution as it is processed by the encoder. Similarly, at the decoder, before decoding macroblocks from different resolution sources the decoder needs to be context switched and information from a previous (and in some cases a future) frame must be provided in the resolution associated with the macroblock. The standard encoder and decoder must, therefore, operate cooperatively with complex circuitry to provide the necessary context switching functionality. Furthermore, since context switching need be performed on a macroblock-by-macroblock basis, substantial computational overhead is required to enable individual marcroblocks to be processed separately.

An object of the present invention is to combine and decode multiple resolution coded and compressed video input data streams into a single video output signal using a single standard decoder without the complexity of context switching.

SUMMARY OF THE INVENTION

In accordance with the present invention, plural input bitstreams representing coded and compressed pixel data from frames of associated input image signals, such as video signals, are simultaneously decompressed and decoded to form a single output bitstream representing decoded and decompressed pixel data in a frame of an output image signal that is a composite of the frames of the input image signals. When each coded and compressed input bitstream is coded in successive segments in which each successive segment is identifiably associated with a predetermined part of the associated input image without fully decoding the input bitstream, segments from each of the plural input bitstreams can be multiplexed in the coded and compressed domain so as to create a combined bitstream of successive segments of coded and compressed pixel data that represents a composite of the plural input image signals. A single decoder which decompresses and decodes successive segments of an image signal can thus be used to form the output bitstream of decoded and decompressed pixel data of the composite image.

More particularly, in accordance with the video decoding system of the present invention, a single generic MPEG decoder is used to decode and decompress plural input bitstreams representing coded and compressed pixel data from frames of plural input video signals of plural input images A single output bitstream is formed representing pixel data in flames of an output video signal that is a composite of the frames of the plural input video signals. Each coded and compressed input bitstream has been coded and compressed in a frame divisible format of successive slices which represent the coded and compressed pixel data in one or more macroblocks of pixels in a frame of the associated input signal, wherein each slice has an identifiable Slice Start Code (SSC) which identifies a row of the slice in the frame of the associated input video signal, and the first macroblock in each slice has a Macroblock Address Increment (MAI) which identifies the position of that first macroblock relative to a fixed position in the frame and which can be retrieved from the coded and compressed pixel data in the slice.

The decoding system of the invention combines, in the coded and compressed domain, frames from the plural input signals to form a single combined bitstream that can be decoded by a standard MPEG decoder to produce a composite frame comprising frames of the plural inputs. The combined bitstream is formed by storing the coded and compressed pixel data in each input bitstream representing one frame and multiplexing slices of the stored data from each input bitstream in a predetermined manner so that the resultant combined bitstream of successive slices represents the coded and compressed pixel data in a composite frame. In combining the slices from the plural input bitstreams, the SSC of each slice is renumbered as necessary in the combined bitstream according to the row of the pixel data associated with the slice in the composite frame and the MAI of each slice is renumbered as necessary according to the relative position of the first macroblock of the slice in the composite frame. The resultant combined bitstream is inputted to the standard MPEG decoder, which is blind to the composite nature of its input. The MPEG decoder decompresses and decodes the combined bitstream to form a composite frame of pixel data which can be decoded and displayed as a composite image.

DETAILED DESCRIPTION

By exploiting the interframe redundancy in video signals through motion estimation, coders build in accordance with MPEG and MPEG-2 coding standards (see e.g., D. Le Gall, "MPEG: A Compression Standard for Multimedia Applications," *Communications of the ACM*, Volume 34, Number 4, April 1991, pp. 46–58; and "Generic Coding of Moving Pictures and Associated Audio Information: Video," Recommendation ITU-T H.262, IAO/IED 13818-2, Draft International Standard, November 1994) achieve a high degree of compression. Specifically, MPEG encoders under both standards are based on discrete cosine transform (DCT) processing that operates on macroblocks of pixels of size, for example, of 16×16 for the luminance component of the video signal. For each macroblock in a current video frame to be coded, a "closest" macroblock in a previously coded frame is located and a motion vector of the spatial movement between the macroblock in the current block and the closest macroblock the previous frame is determined. Pixel-by-pixel differences between the current macroblock and the closest macroblock, are transformed by DCT processing in each block of 8×8 pixels within the macroblock and the resultant DCT coefficients are quantized and variable-length entropy coded and transmitted together with the motion vectors for the macroblock. Considerable data compression can be achieved using the MPEG coding standards.

In coding and compressing a video sequence using the MPEG standards, the beginning of each coded and compressed video sequence, the beginning of a group of a predetermined number of coded and compressed video frames, and the beginning of each coded and compressed video frame are coded and delineated in the resultant bitstream with identifiable headers. Further, groups of one or more macroblocks within the same horizontal row, called slices, are processed together to produce a variable-length coded data string associated with the macroblock or macroblocks of pixels in the slice. Each horizontal row of macroblocks across the coded and compressed video frame thus consists of one or more slices. Each slice can be located in the bitstream of data for the frame through identifiable byte aligned Slice Start Codes (SSCs) which both identify the start of each slice and the vertical position of the slice with respect to the top of the video frame. The slices are thus numbered from 1 et seq., with all slices derived from the same horizontal row of macroblocks having the same slice number. A slice is then the smallest unit of data that can be identified in the coded and compressed bitstream associated with a frame of data without decoding the bitstream. The number of macroblocks in each slice on any given horizontal row is a programmable parameter that vary within each row of macroblocks and from row to row. Also associated with each macroblock, in accordance with the MPEG standard, is a Macroblock Address Increment which represents the macroblock's position in the video frame relative to the beginning of the slice. The first Macroblock Address Increment in each slice, however, represents the address of the first macroblock in the slice relative to the first macroblock in the upper left-hand corner of the video frame. Since it is associated with the first macroblock in each slice, the Macroblock Address Increment for the first macroblock in each slice is readily locatable in the variable-length coded bitstream of data for the slice and thus can be retrieved and decoded without decoding the bitstream. The positions of the other Macroblock Address Increments in the bitstream of data for each slice vary in accordance with the variable-length coded data and therefore can not be retrieved without decoding the bitstream. These other Macroblock Address Increments are referenced to the first macroblock in the slice of which it is part of.

In order to produce multiple resolution coded video bitstreams from one input video signal with a single MPEG standard encoder, and to produce from multiple resolution coded video inputs a collage or windowed video display with a single MPEG standard decoder, several factors must be considered. Because of interframe coding, MPEG uses three different frame types: intra (I) frames, predictive (P) frames, and bidirectional (B) frames. I frames are coded solely based on the spatial correlation that exists within a single frame and do not depend on other frames. As such, I frames can be decoded independently. I frames are generally transmitted upon a scene change when there is little or no correlation between successive frames, and periodically every fixed number of frames. P frames are predicted based on a previous frame and B frames are predicted based on past and future frames. In implementing a multiple video system with MPEG, the motion estimation and different frame types cause the following problems. Firstly, if a collage of pictures is provided as input to an MPEG encoder, the motion estimation algorithm may incorrectly use parts from one picture in estimating the motion of blocks from another picture, which therefore prevents their independent use at a decoder; secondly, a decoder cannot decode segments from different frame types mixed in the same frame; and thirdly, context switch, i.e. changing the state information for encoding or decoding from different sources using a single encoder or decoder is complicated. The encoding and decoding systems described herein below overcome these difficulties by utilizing a single generic MPEG encoder to generate multiple independent resolution MPEG syntax video data streams simultaneously from a single source of video and, correspondingly, by utilizing a single generic MPEG decoder for simultaneously decoding such streams received from multiple sources.

The encoder of the present invention can be used with any video source type, examples of which are: NTSC, PAL, SECAM or a progressively scanned source. For purposes of illustration only, it will be assumed that the input signal is an NTSC signal, which comprises two interlaced fields per video frame, at a frame rate of 30 frames per second, each frame comprising 525 scan lines. With reference to the encoding system of the present invention in FIG. 1, each frame of the video input signal on 101 is digitized by a conventional, well known in the art, analog-to-digital converter 102 which digitizes the analog input signal into a digital signal of 640×480 pixels. The frame is separated into its two separate component fields 103 and 104, each having a resolution of 640×240 pixels. For an NTSC input, this is a trivial operation since the video signal is already divided into two fields per frame. Filtering and subsampling circuitry 105 horizontally filters and subsamples field 1 to produce a 320×240 pixel picture and then horizontally and vertically filters and subsamples that picture to produce a 160×112 pixel picture. Field 2 is similarly horizontally filtered and subsampled to produce a 320×240 pixel picture, and then horizontally and vertically filtered and subsampled again to produce an 80×48 pixel picture. Filtering and subsampling circuit 105 is a conventional circuit, well known in the art, which includes digital anti-aliasing filters for low-pass filtering the input signal for purposes of removing high frequency components that could otherwise corrupt a subsampling operation. As previously described, the MPEG encoder processes the pixel data in block format, which for way of example, comprises 16×16 pixels per macroblock for the luminance portion of the video signal. In order to define each resolution picture along macroblock boundaries, the resolution of each picture is chosen to be in integral multiples of 16 in both the horizontal and vertical directions The four subsampled component fields are stored in a logical flame buffer 106, which comprises 640×512 pixel storage locations. The subsampled fields are separated from each other within buffer 106, however, by "guard bands", shown in FIG. 1 by the cross-hatched area. As the pixel data is fed to a generic MPEG encoder 107 from buffer 106, the guard bands prevent one picture in the buffer from being used in conjunction with an adjoining picture as motion compensation processing searches for a best matching macroblock and computes motion vectors therefrom. By filling the guard bands with a pattern that is not likely to be found in a normal video sequence, such as a pixel based checker board pattern, the motion estimation algorithm will never pick a matching block from the guard band area, thereby ensuring that motion estimation for each individual resolution picture is limited to its own perimeter-defined area.

Figure 1:
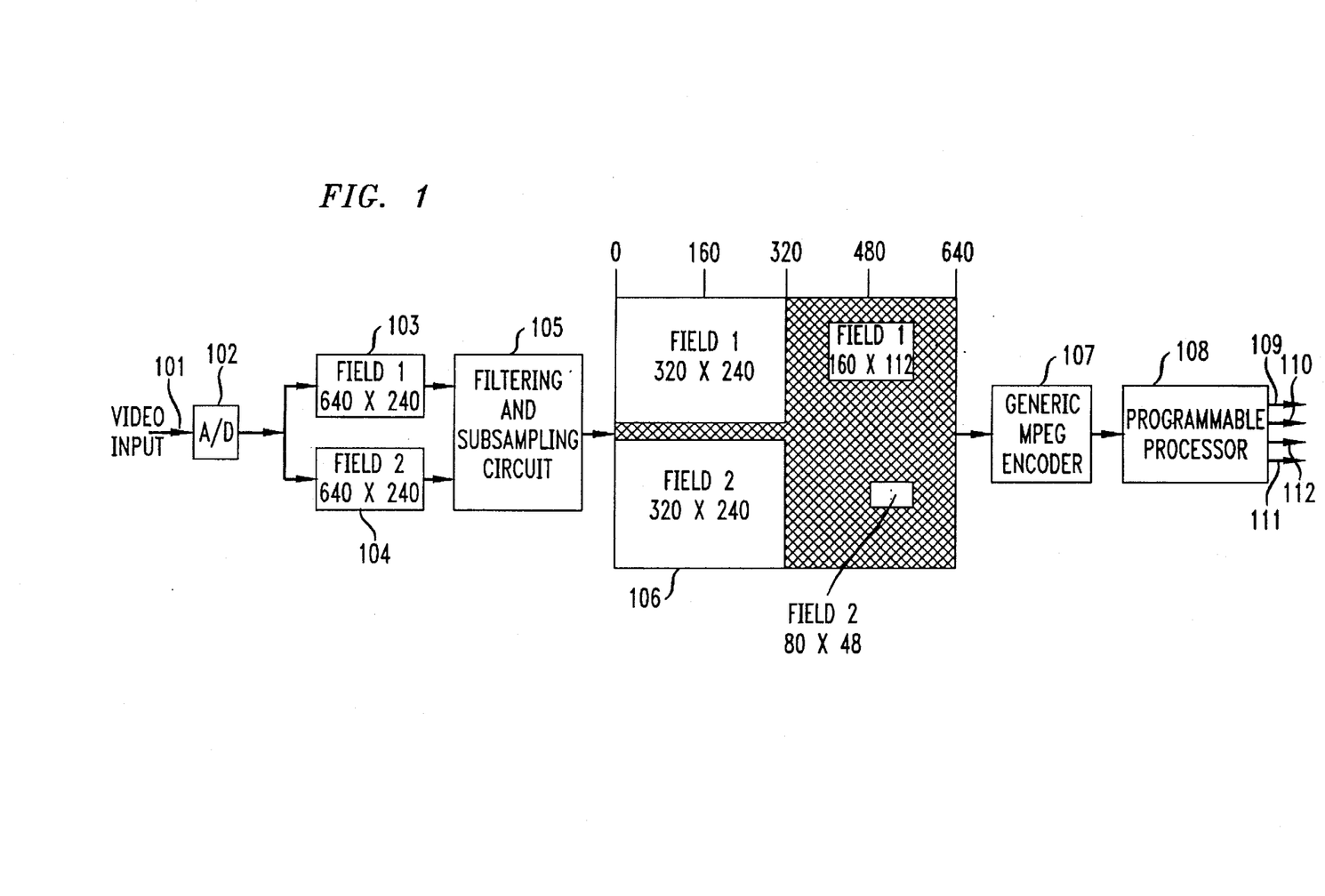
FIG. 1 is a block diagram of an encoding system that employs a single standard MPEG coder for simultaneously generating multiple resolution compressed video data streams from a single video input.

As has been discussed, the MPEG encoder processes each input video frame in macroblocks and slices. As will be discussed, the MPEG standard encoder processes the pixel data in the logical frame buffer 106 horizontally in slice format. Thus, the horizontal edges of each of the four resolution component pictures stored in the logical frame buffer 106 are along slice boundaries, and thus also, macroblock defined horizontal boundaries, and the vertical edges of each resolution picture are along macroblock defined vertical boundaries. Thus, for macroblocks defined as 16×16 pixels (for luminance), the horizontal edge of each component picture is along a slice row of pixels that is an integral multiple of 16, and the vertical edge of each component picture is along a macroblock edge of pixels that is also an integral multiple of 16. Further, to vertically separate field 1 and field 2 to prevent motion estimation within one of the pictures from using the other, the guard band consists of two slice rows, or 32 pixels high.

The contents of the logical frame buffer 106 can be outputted in raster-order to the generic MPEG encoder 107. Although shown in FIG. 1 as an actual physical frame buffer of pixel size 640×512 (32 slices high), logical frame buffer 106 represents in actuality a time arrangement for presenting data from the four resolution pictures to the MPEG encoder 107 so that the encoder 107 can produce four independent output coded video bitstreams. Thus frame buffer can be a 640×512 pixel frame storage device, or it can be a storage device of smaller size that has sufficient storage space to store the processed filtered and subsampled data as outputted by filtering and subsampling circuit 105, which are then provided, as needed, as an inputs to the generic MPEG encoder 107. In order to be used with a multistream decoder, described hereinafter, MPEG encoder 107 must code each frame as a predictive frame (P-frame) using the same quantization matrix for each sequence. Individual slices or macroblocks within these, however, can be coded as intra (I) whenever needed. Quantization factors can also be adjusted at the macroblock level. This way a decoder can mix slices from different streams under a single frame. By restricting the motion compensation search range to the size of the guard bands around a picture, the MPEG coder 107 produces a single bitstream which contains the compressed video for the four resolutions, 320×240 (field 1), 160×112 (field 1), 320×240 (field 2), and 80×48 (field 2). The slice size, motion estimation range and "P-frame coding only" are all programmable parameters for "generic" MPEG encoders.

The pixel data in frame buffer 106 is fed pixel-by-pixel to encoder 107, which processes the data in 16×16 pixel macroblocks (for the luminance component) and encodes each macroblock and group of macroblocks along a common horizontal row (the slices). Encoder 107 is essentially "blind" to the fact that the input being provided to it consists of plural images at different resolutions rather than a single higher resolution image. As aforenoted, each component image is separated from one another by a guard band containing a pattern unlikely to appear in any image. Encoder 107, when comparing the data presented to it from the current frame as stored in buffer 107, with the data from a previous frame as is stored in its own internal buffer, will therefore not likely find a matching block in its search range from anywhere other than its own resolution picture.

As previously described, the MPEG encoder 107 groups macroblocks into slices which can be identified in the resultant compressed data stream with Slice Start Codes that both delineate the beginning of each slice and which indicate the vertical position of the slice relative to the top of the coded image. As previously noted, the slice length is an adjustable programmable parameter which can vary line-by-line and within each row throughout the entire composite image presented to the encoder from buffer 106. By limiting the length of a slice along all horizontal rows that encompass more than one individual image in frame buffer 106 to be no longer than the shortest width picture, and by placing the vertical edge of each resolution picture on a slice boundary, the coded data associated with each resolution picture can be demultiplexed at the slice level, without needing to decode the compressed data stream.

Figure 2:
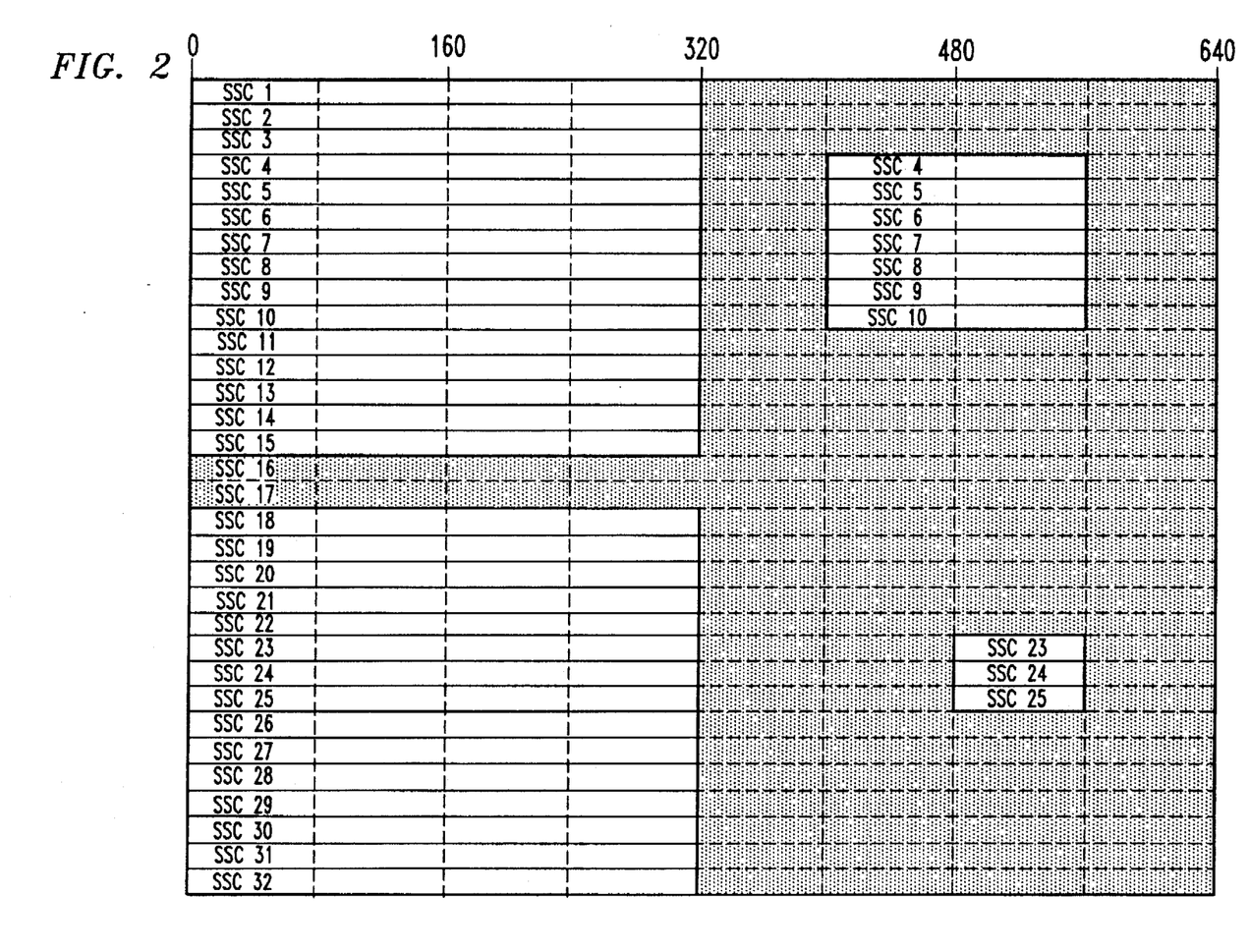
FIG. 2 shows an arrangement for inputting pixel data from a plurality of different resolution inputs to the standard MPEG coder in the encoding system of FIG. 1.

FIG. 2 shows frame buffer 106 divided into 32 rows for processing by encoder 107. As previously noted, the Slice Start Code (SSC) of each slice along each row is the same. The Slice Start Codes for the slices in the 320×240 (field 1) resolution picture are numbered 1–15 and the Slice Start Codes for the slices in the 320×240 (field 2) resolution picture are numbered 18–32. The 160×112 (field 1) resolution picture consists of seven slices having SSC's 4–10, and the 80×48 (field 2) resolution picture consists of three slices having SSC's 23–25. By way of example, the slice length of each slice in each row is chosen to be 80 pixels, or five macroblocks. By so selecting the slice length, the 160×112 (field 1) picture begins in the horizontal direction at pixel number 400 so as to be placed at a slice boundary and the 80×48 (field 2) picture begins in the horizontal direction at pixel number 480. The compressed bitstream produced by encoder 107 having slices which are identifiably attributable to each of the component resolution pictures can be demultiplexed into four separate resolution bitstreams.

The compressed composite output bitstream of encoder 107 is inputted to a programmable digital signal processor 108. Since the Slice Start Codes are uniquely decodable and byte aligned in the encoded bitstream, their identification is straightforward. The slices belonging to each different resolution picture are thus stripped into four independent streams, with the slices associated with the "data" in the slices within the guard band in frame buffer 107 being deleted. In forming each independent bitstream for each resolution picture for output on output leads 109–112, however, the Slice Start Codes for certain resolution pictures need to be renumbered. Thus, for the 160×112 (field 1) picture, the Slice Start Codes shown in FIG. 2 as being numbered 4–10, are renumbered 1–7, respectively. Similarly, for the 320×240 (field 2) picture, the Slice Start Codes numbered 18–32 are renumbered 1–15, respectively. The Slice Start Codes numbered 23–24 in the 80×48 (field 2) picture are renumbered 1–3, respectively. Because of its position in the composite frame, the Slice Start Codes 1–15 for the 320×240 (field 1) picture do not need to be renumbered.

The horizontal position of a slice is determined from the address of the first macroblock, which can't be skipped (i.e., always included as a coded block) according to MPEG standards. The address for the first macroblock of a slice is a function of the previous slice number and the number of macroblocks per slice. As previously noted, the macroblock address indicator (MAI) is referenced to the first macroblock in the upper left-hand corner of the picture. For an input frame described above comprising 640×512 pixel locations, there are equivalently 40×32=1280 macroblocks. In forming the four separate resolution bitstreams, in addition to the Slice Start Code renumbering that processor 108 must effect described above, the MAI associated with the first macroblock in each slice in each stream is also likely to require changing to properly reference each slice to beginning of its new lower resolution picture. Thus, for example, in forming the 320×240 (field 1) bitstream, the MAI in each slice having SSC=2 in the 320×240 (field 1) picture is decreased by 20, the MAI in each slice having SSC=3 in this same picture is decreased by 40, the MAI in each slice having SSC=4 is decreased by 60, etc., so that the resultant MAIs in this bitstream are properly referenced to the 320×240 resolution size, which contains only 300 macroblocks. The MAIs in the other resolution bitstreams are similarly renumbered in accordance with their position in frame buffer 107 and their particular resolutions.

As previously discussed, the location of the MAI in each slice is readily locatable since it is very close to the Slice Start Code. Accordingly, it can be located and renumbered without decoding the slice bitstream. This MAI is variable length coded and therefore not byte aligned. Frequently, therefore, renumbering of this address necessitates bit level shifts for the rest of the slice to ensure that all succeeding slices in the demultiplexed bitstream remain byte aligned. Thus, binary '0's are added to the end of the slice's bitstream, where needed, to compensate for renumbering the slice's MAI.

Figure 3:
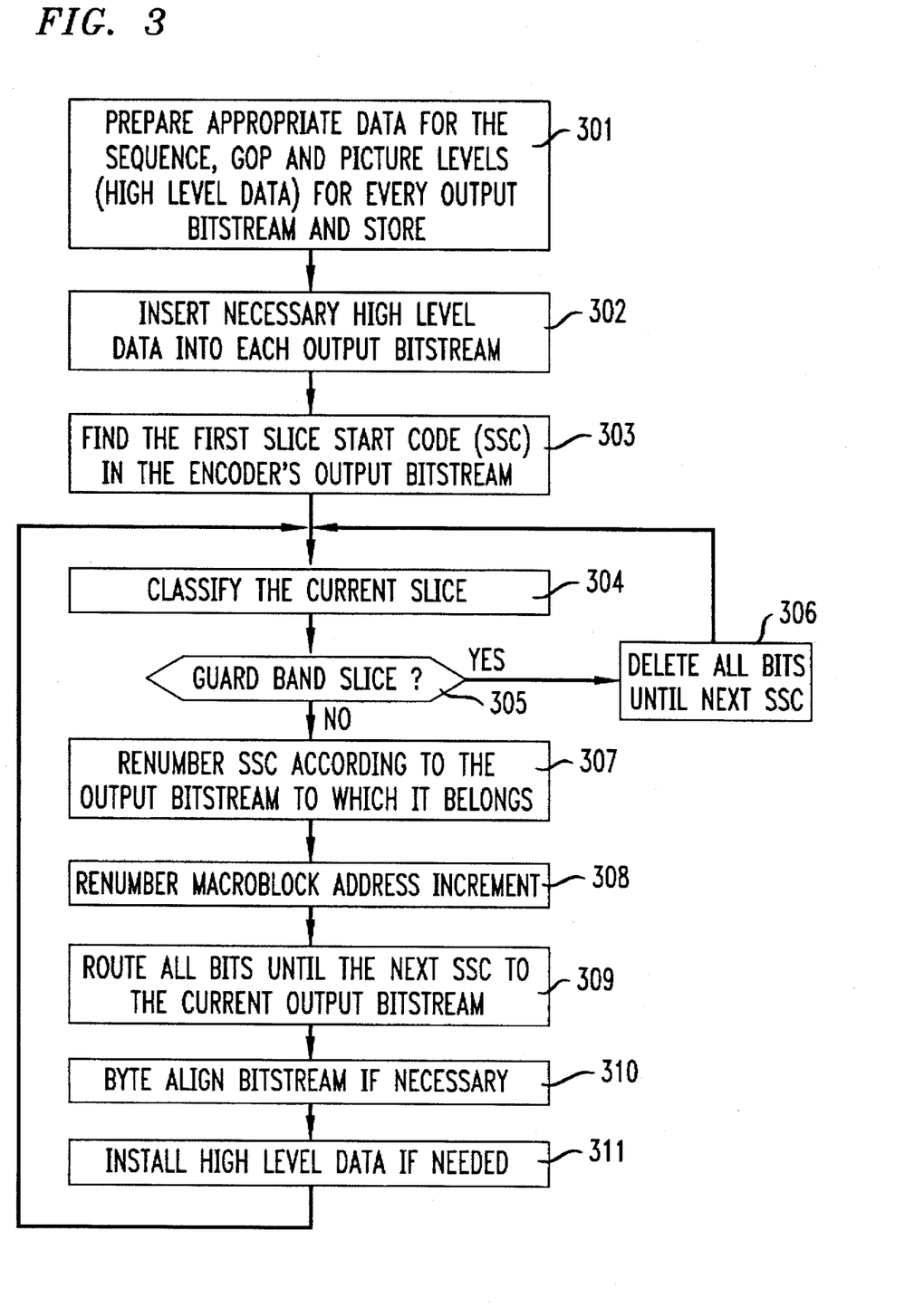
FIG. 3 is a flow chart showing the processing steps used by a programmable signal processor, at the output of MPEG coder in the encoding system of FIG. 1, for generating the multiple resolution compressed video data streams.

The processing steps required of processor 108 to form the separate multiple resolution outputs are shown in FIG. 3. At step 301 the appropriate high level data is prepared for each of the multiple resolution bitstreams to be outputted. This high level data (HLD) includes the video sequence header, the GOP (group-of-picture) headers, and the picture level headers. This data is stored for both present and future placement in each component bitstream. At step 302 the necessary HLD is inserted into each output bitstream. At step 303 the first SSC is located in the output composite bitstream of encoder 107. At step 304 the current slice is classified. By examining both the SSI and the MAI or the first macroblock, and from a known pattern that relates SSIs and MAIs to the separate resolution pictures or to the guard band, each slice is associated with either one of the output bitstreams being formed or to the guard band. At decision step 305, if the slice is a guard band slice all its bits are deleted (step 306) until the next SSC. If not a guard band slice, the SSC and Macroblock Address Increments are renumbered in accordance with the output stream to which the slice is directed (steps 307 and 308). The slice is then routed to the appropriate output stream (step 309) and byte aligned, where necessary to compensate for changes in the slice length due to the replacement MAI (step 310). All the slices in the output stream from encoder 107 are thus sequentially processed, their SSIs and MAIs renumbered as necessary, and directed to their appropriate output bitstreams. When the entire frame of data has been processed, the necessary high level data is reinserted into each output bitstream (step 311) and the next sequential frame is processed.

As is apparent, by preprocessing and post-processing the video bitstream inputted to the generic MPEG encoder 107, multiple resolution output bitstreams are produced without in anyway needing to modify the encoder itself. The compressed coded multiple resolution video bitstreams on outputs 109–111 can be transmitted over a network for selective reception, or stored in a video storage medium for later individual retrieval.

Figure 4:
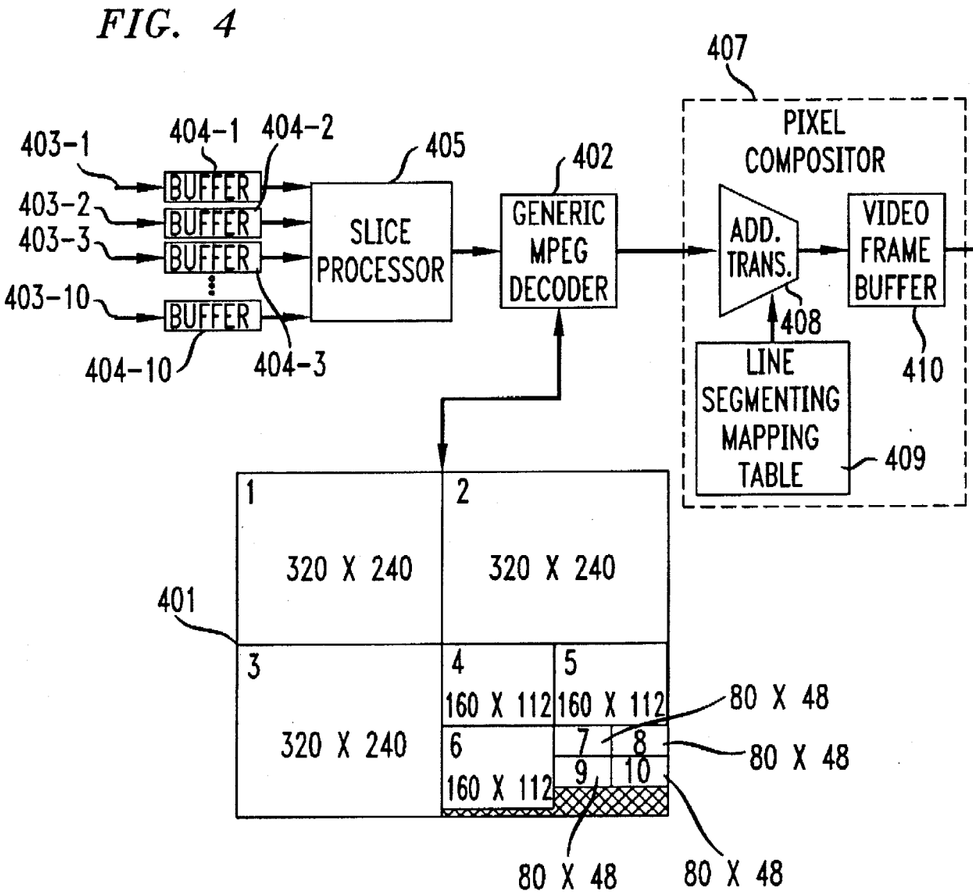
FIG. 4 is a block diagram of a decoding system in accordance with the present invention that employs a single standard MPEG decoder for compositing multiple resolution compressed video data streams into a single image.

FIG. 4 illustrates a decoder capable of decoding and compositing several multiple resolution streams generated by either the above described encoding process or any other MPEG format coding process. This decoder incorporates a standard generic MPEG decoder to decode and composite these plural component multiple resolution video signals. These coded video signals would likely originate from different sources so that the decoded composited video image will be a collage of multiple images having different sizes on the receiver's video display device. The key to transforming a generic MPEG decoder into a multiple video decoder is the partitioning of the internal frame buffer 401 used by the generic MPEG decoder 402. As shown, it is possible to place several lower resolution component pictures within frame buffer 401, which normally holds a single 640×480 resolution frame of video. This is accomplished by presenting the slices from each of the coded input signals in a predetermined order to the decoder 402 that mirrors the order of slices in the partitioned frame buffer 401. Simultaneously, the Slice Start Codes and Macroblock Address Increments of the presented slices are renumbered, where necessary, in accordance with their position in the partitioned frame buffer. Once frame buffer 401 is partitioned, a decoded displayed image will be a single image that comprises the plural lower resolution input images in the partitioned format of the frame buffer 401.

In the example shown in FIG. 4, frame buffer 401 is capable of holding three 320×240 pixel resolution images, three 160×112 pixel resolution images and four 80×48 pixel images. The up to ten MPEG coded input bitstreams associated with these images and received on inputs 403-1–403-10 are inputted to line buffers 404-1–404-10, respectively. The incoming bitstreams must first be buffered because the slice processing requires access to the input slices in order of their placement within the frame buffer 401, and the input sequence of the multiple input bitstreams cannot be readily controlled from geographically distributed sources. Also, with most currently available MPEG decoders, a complete compressed frame must be provided without any breaks in the input data.

The buffered input streams are applied to slice processor 405, which processes the slices to create a multiplexed bitstream that places each slice in a predetermined location in the bitstream so that, when input to the internal frame buffer 401, each slice will be located in the physical frame storage location of the image with which it is associated. Slice processor 405 can be a digital signal processor or a CPU, which operates on the input streams and buffers the modified streams. As programmable processor 108 did in the encoder of FIG. 1, as described herein above, slice processor 405 examines the Slice Start Codes of each slice within the component bitstream and renumbers it according to its predetermined position in the composite image that will be formed from the combined bitstream. Thus, for example, the SSC of each slice from a 320×240 pixel resolution input bitstream directed to the 320×240 pixel image area in location 3 in frame buffer 401 is renumbered from between 1 and 15, to between 16–30, respectively; for proper placement. As further examples, the SSC of each slice in a 160×112 pixel resolution input bitstream directed to the 160×112 pixel image area in location 6 in frame buffer 404 is renumbered from between 1 and 7, to between 23 and 29, respectively; and the SSC of each slice in an input bitstream directed to the 80×48 pixel image area in location 10 is renumbered from between 1 and 3, to between 26 and 28, respectively. On the other hand, the SSCs of 320×240 pixel input bitstreams directed to the 320×240 pixel image areas 1 or 2 do not need to be renumbered since they remain between 1 and 15 in the composite image.

As was the case in forming the multiple resolution video signals from the single input in the encoder of FIG. 1 described above, the Macroblock Address Increments associated with the first macroblock in each slice generally also need to be renumbered in the composite bitstream. Thus, as previously described, the MAI associated with the first macroblock in each slice is accessed, read, renumbered, and reinserted into the slice so as to properly reference each slice to the first macroblock in the upper left-hand corner of the composite image rather than to the first macroblock in the upper left-hand corner of each individual component image. As in the case of the encoder, when substituting one MAI with another in the variable-length coded bitstream, fill '0' bits may need to be inserted at the end of the slice to maintain byte alignment.

Figure 5:
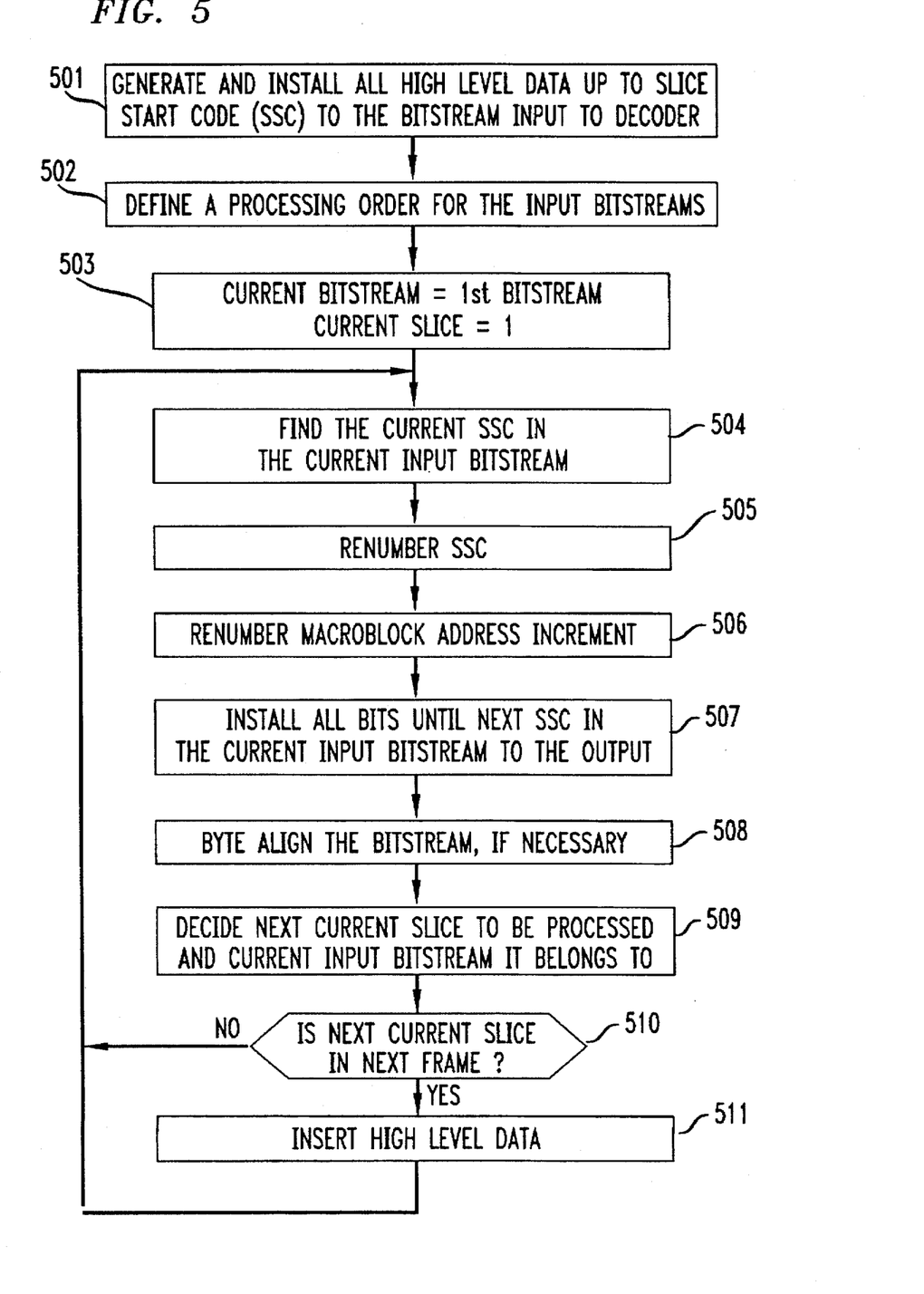
FIG. 5 is a flow chart showing the processing steps used by a programmable signal processor at the input of the MPEG decoder in the decoding system of FIG. 4.

FIG. 5 shows a flow chart of the processing steps of slice processor 405 as it processes the buffered component lower resolution bitstreams on inputs 403-1–403-10. At step 501 the necessary high level data for the composite bitstream is prepared and installed since the high level data indicating resolution, etc., in each component input bitstream is inapplicable to the 640×480 resolution of the composite image bitstream. At step 502 a processing order for the input bitstreams is established to effect processing of the slices in the order prescribed by the partitioned frame memory arrangement. At step 503 the current bitstream is set as the first bitstream to be placed in position 1 in the composite image (shown in frame buffer 401 in FIG. 4) and the current SSC is also set as 1. The current SSC in the current input bitstream is then located at step 504, which for the first bitstream and SSC of 1, is the slice having SSC=1 in the 320×240 input 1. At steps 505 and 506 the SSC and MAI are adjusted for that slice, which for that first slice in the first input is not required. The bits in the current slice are then sent to the decoder 402 at step 507 after being byte aligned (step 508), if necessary (not necessary when the SSC and MAI are not renumbered). At step 509, a decision is made what next current slice is to be processed from what current bitstream. This decision is based upon both the input bitstream and the particular slice just processed, and the order of presentation necessary to effect the desired partitioning of frame buffer 401. If the next slice to be processed is from the same frame, determined at step 510 based on the slice and input bitstream just processed, then steps 504 through 509 are repeated for this next slice within the frame. If the next current slice to be processed is in the next frame, than at step 511 high level data (picture start code, etc.) is inserted into the bitstream inputted to decoder 402 (step 511) and then steps 504 through 508 are repeated.

The resultant composite bitstream outputted by slice processor 405 appears for all purposes to MPEG decoder 402 as a single resolution bitstream and decoder 402 utilizes the partitioned frame buffer 401 as if it contains a single stream. Thus, the decoder 402 is blind to the composite nature of its input and decodes all slices and macroblocks as if they belong to the same single image. It needs to be noted that processing of the multiple inputs in this manner is only possible if all the input streams are encoded using just P-frames. This is because slices from different frame types cannot be mixed.

The cross-hatched slices at the bottom of the lower resolution pictures in frame buffer 401 are for size adjustment and do not require any processing by the decoder. The resultant digital raster output from decoder 402 can be outputted directly to a monitor, which displays the up to ten separate component images derived from the ten input streams as a composite collage of images. In such a display, each image is shown in its position in frame buffer 401. A more general output can be produced by inputting the output of decoder 402 to a pixel compositor 407, which consists of an address translator 408, a line segment mapping table 409, and a video frame buffer 410. Pixel compositor 407 performs the functions of placement and scaling of the independent images within the digital raster. The output of the address translator 408 is placed into the video frame buffer 410 for display on either a computer monitor or a television monitor. The number of pictures to be placed in the frame buffer can be reduced by using "still" pictures for the unused locations.

Pixel compositor 407 performs the remapping and horizontal interpolation function on the raster output of decoder 402. The pixel compositor keeps track of the current line and pixel within the raster using standard line-counter and pixel-counter circuitry. Using this information, address translator 408 parses the raster into fixed line segments and using the line segment mapping table 400, redirects a given line segment to any other segment within the video frame buffer 410. Also, a given line segment can be expanded using linear interpolation within the pixel compositor. The command to expand a given line segment is part of the line segment mapping table.

Although is may appear that the system is limited to displaying only 320×240 pixel resolution streams or less, this is not the case. It is possible to combine the two 320×240 pixel coded fields from one source into a single 640×480 pixel image by horizontally interpolating and by interlacing the scan lines of the two fields into the video frame buffer. This uses up half the I and P frame memory leaving room for two more 320×240 streams or other combinations having the equivalent area of 320×240. Clearly, if needed, the generic MPEG decoder 401 can also decode a genuine 640×480 resolution picture.

The multiple resolution encoder and multiple resolution decoder described herein above can interact together with each other or separately. Thus, the separate resolution outputs of the encoder can be decoded either with a standard MPEG decoder or with a multiple resolution decoder described herein above which incorporates the standard MPEG decoder. Similarly, the source of the various resolution inputs to the multiple resolution decoder described herein above can be from separate MPEG encoders, and/or from multiple resolution encoders of the type described above. Further, when the described encoder transmits one of its resolution outputs to the described decoder, a user in viewing the received video signal may decide to increase or decrease the size of the display window. By transmitting a resolution request signal to the encoder, one of the other resolution outputs of the multiple resolution encoder can be transmitted to the user in addition to or in place of the original resolution video signal. For example, a user viewing a 320×240 (field 1) resolution video signal may decide to view a full resolution image. The 320×240 (field 2) image may then be additionally transmitted, which would be combined with the 320×240 (field 1) image by horizontal interpolation and interlacing to produce a full resolution 640×480 video signal. Alternatively, any one resolution signal can be replaced by any other available lower or higher resolution signal.

Although described in conjunction with an MPEG standard decoder, the present invention can be used with other types of decoders for simultaneously decoding plural input bitstreams representing coded and compressed pixel data from frames of associated input images. As long as each input bitstream is coded and compressed in successive segments in which each successive segment is identifiably associated with a predetermined part of its input image without fully decoding the input bitstream, the input bitstreams can be combined in the coded and compressed domain to form a frame of a composite image which can then be decompressed and decoded by a decoder which processes the segments in the combined bitstream as if they were associated with a single image.

The above-described embodiment is illustrative of the principles of the present invention. Other embodiments could be devised by those skilled in the art without departing from the spirit and scope of the present invention.

The invention claimed is:

1. A video decoding system for simultaneously decoding plural input bitstreams representing coded and compressed pixel data from frames of associated plural input video signals of plural input images to form a single output bitstream representing decoded and decompressed pixel data in frames of an output video signal that is a composite of the frames of the plural input video signals, each of said coded and compressed input bitstreams being coded and compressed in a frame divisible format of successive slices which represent the coded and compressed pixel data in one or more macroblocks of pixels in a frame of the associated input video signal, each slice having an identifiable delineated slice start code (SSC) which identifies a row of the slice in the frame of the associated input video signal, and a first macroblock in each slice having an identifiable macroblock address increment (MAI) which identifies the position of that first macroblock in the slice relative to a fixed position in the frame and which can be retrieved from the coded and compressed pixel data in the slice in the input bitstream, the system comprising:

a plurality of storage means, each storage means for storing a portion of one of said input bitstreams that represents the coded and compressed pixel data in a frame of the associated input video signal;

processing means for multiplexing slices of the coded and compressed pixel data from the stored portions of the input bitstreams in said plurality of storage means in a predetermined manner to form a combined bitstream of successive slices of coded and compressed pixel data that represents coded and compressed pixel data in a composite frame that is a composite of the frames of the input video signals associated with the multiplexed input bitstreams, the SSC of each slice being renumbered as necessary in the combined bitstream according to the row of the pixel data associated with the slice in the composite frame and the MAI of each slice being renumbered as necessary according to the relative position of the first macroblock of the slice in the composite frame; and a single standard decoder which converts the combined bitstream of successive slices of coded and compressed pixel data associated with the composite frame to a decoded and decompressed composite frame of pixel data, wherein the decoded and decompressed composite frame of pixel data can be decoded and displayed as a single image comprising plural input images associated with the input bitstreams multiplexed by said processing means.

2. The decoding system of claim 1 wherein said single standard decoder is an MPEG standard decoder.

3. The decoding system of claim 1 further comprising a pixel compositor for rearranging the plural images in the composite frame.

4. The decoding system of claim 1 wherein the plural input video signals have different resolutions.

5. The decoding system of claim 4 wherein the different resolutions of the plural input video signals are ¼, ⅛ and 1/64 of the resolution of the composite frame.

6. A method for simultaneously decoding plural input bitstreams representing coded and compressed pixel data from frames of associated plural input video signals of plural input images to form a single output bitstream representing decoded and decompressed pixel data in frames of an output video signal that is a composite of the frames of the plural input video signals, each of said coded and compressed input bitstreams being coded and compressed in a frame divisible format of successive slices which represent the coded and compressed pixel data in one or more macroblocks of pixels in a frame of the associated input video signal, each slice having an identifiable delineated slice start code (SSC) which identifies a row of the slice in the frame of the associated input video signal, and a first macroblock in each slice having an identifiable macroblock address increment (MAI) which identifies the position of that first macroblock in the slice relative to a fixed position in the frame and which can be retrieved from the coded and compressed pixel data in the slice in the input bitstream, the system comprising:

storing a portion of each of the input bitstreams that represents the coded and compressed pixel data in a frame of the associated input video signal;

multiplexing slices of the coded and compressed pixel data from the stored portions of the input bitstreams in a predetermined manner to form a combined bitstream of successive slices of coded and compressed pixel data that represents coded and compressed pixel data in a composite frame that is a composite of the frames of the input video signals associated with the multiplexed input bitstreams, the SSC of each slice being renumbered as necessary in the combined bitstream according to the row of the pixel data associated with the slice in the composite frame and the MAI of each slice being renumbered as necessary according to the relative position of the first macroblock of the slice in the composite frame; and converting the combined bitstream of successive slices of coded and compressed pixel data associated with the composite frame to a decoded and decompressed composite frame of pixel data using a single standard decoder, wherein the decoded and decompressed composite frame of pixel data can be decoded and displayed as a single image comprising plural input images associated with the multiplexed input bitstreams.

7. The method of claim 6 wherein the single standard decoder is an MPEG standard decoder.

8. The method of claim 6 further comprising the step of rearranging the plural images in the composite frame.

9. The method of claim 6 wherein the plural input video signals have different resolutions.

10. The method of claim 9 wherein the different resolutions of the plural input video signals are ¼, ⅛ and 1/64 of the resolution of the composite frame.

11. A decoding system for simultaneously decoding plural input bitstreams representing coded and compressed pixel data from frames of associated input image signals to form a single output bitstream representing decoded and decompressed pixel data in a frame of an output image signal that is a composite of the frames of the plural input image signals, each of said coded and compressed input bitstreams being coded in successive segments in which each successive segment is identifiably associated with a predetermined part of the associated input image without fully decoding the input bitstream, the system comprising:

means for multiplexing segments from each of the plural input bitstreams in a coded and compressed domain in a predetermined manner to form a combined bitstream of successive segments of coded and compressed pixel data, the segments being ordered in the combined bitstream in such a manner that the combined bitstream represents a coded and compressed single frame that is a composite of the frames of the plural input image signals; and means for decompressing and decoding the successive segments of the combined bitstream to form a frame of pixel data of an image signal that is a composite of the frames of the plural input image signals.

12. The decoding system of claim 11 further comprising a pixel compositor for rearranging the images within the composite output image.

13. The decoding system of claim 11 wherein the input image signals are video signals.

14. The decoding system of claim 13 wherein the means for decompressing and decoding is an MPEG standard decoder.

15. The decoding system of claim 11 wherein the input image signals have different resolutions.

16. The decoding system of claim 15 wherein the different resolutions of the input image signals are ¼, ⅛ and ¹⁄₆₄ of the resolution of the composite output image.

17. A method for simultaneously decoding plural input bitstreams representing coded and compressed pixel data from frames of associated input image signals to form a single output bitstream representing decoded and decompressed pixel data in a frame of an output image signal that is a composite of the frames of the plural input image signals, each of said coded and compressed input bitstreams being coded in successive segments in which each successive segment is identifiably associated with a predetermined part of the associated input image without fully decoding the input bitstream, the method comprising the steps of:

multiplexing segments from each of the plural input bitstreams in a coded and compressed domain in a predetermined manner to form a combined bitstream of successive segments of coded and compressed pixel data, the segments being ordered in the combined bitstream in such a manner that the combined bitstream represents a coded and compressed single frame that is a composite of the frames of the plural input image signals; and decompressing and decoding the successive segments of the combined bitstream to form a frame of pixel data of an image signal that is a composite of the frames of the plural input image signals.

18. The method of claim 17 further comprising the step of rearranging the images within the composite output image.

19. The method of claim 17 wherein the input image signals are video signals.

20. The method of claim 18 wherein the step of decompressing and decoding uses an MPEG standard decoder.

21. The method of claim 17 wherein the input image signals have different resolutions.

22. The method of claim 21 wherein the different resolutions of the input image signals are ¼, ⅛ and ¹⁄₆₄ of the resolution of the composite output image.

* * * * *